United States Patent
Imachi et al.

(10) Patent No.: US 6,395,426 B1
(45) Date of Patent: May 28, 2002

(54) NON-AQUEOUS ELECTROLYTE CELL HAVING A POSITIVE ELECTRODE WITH TI-ATTACHED LICOO$_2$

(75) Inventors: Naoki Imachi; Yasunobu Kodama; Ichiro Yoshida; Ikuro Nakane; Satoshi Narukawa, all of Sumoto (JP)

(73) Assignee: Sanyo Electric Co., Ltd., Osaka (JP)

(*) Notice: Subject to any disclaimer, the term of this patent is extended or adjusted under 35 U.S.C. 154(b) by 0 days.

(21) Appl. No.: 09/428,542

(22) Filed: Oct. 28, 1999

(30) Foreign Application Priority Data

Oct. 30, 1998 (JP) .......................... 10-311222
Oct. 15, 1999 (JP) .......................... 11-293165

(51) Int. Cl.$^7$ .............................. H01M 4/52
(52) U.S. Cl. ................................ 429/231.3
(58) Field of Search .................. 429/127, 162, 429/163, 231.1, 231.3, 231.5, 231.95

(56) References Cited

U.S. PATENT DOCUMENTS 4,092,464 A  *  5/1978  Dey et al.
6,174,627 B1 *  1/2001  Ohta et al.

FOREIGN PATENT DOCUMENTS

| EP | 0511632 A | 11/1992 |
| GB | 2269265 A | 2/1994 |
| JP | 63-59507 B2 | 11/1988 |
| JP | 5-13082 A | 1/1992 |
| JP | 4-253162 A | 9/1992 |
| JP | 4-319260 A | 11/1992 |
| JP | 4-329267 A | 11/1992 |
| JP | 6-44974 | * 2/1994 |
| JP | 10-1316 | * 1/1998 |
| WO | WO 93/08612 A | 4/1993 |
| WO | WO97/01191 A | 1/1997 |

OTHER PUBLICATIONS

"Huang et al., *Vibrational spectroscopic and electrochemical studies of the low and high temperature phases of* $LiCo_{1-x}M_{2\,2}(M=Ni\text{ or }Ti)$" Solid State Ionics 86–88 (1996) pp. 395–400, No Month Available.

Database WPI, Section Ch, Week 199942, Derwent Publication Ltd., London, GB; AN 1999–504230; XP002129008 & JP 11 219706 A (DOWA Mining Co Ltd.); Aug. 10, 1999 *abstract*.

* cited by examiner

*Primary Examiner*—Gabrielle Brouillette
*Assistant Examiner*—Susy Tsang-Foster
(74) *Attorney, Agent, or Firm*—Armstrong, Westerman, & Hattori, LLP

(57) ABSTRACT

The invention provides a non-aqueous electrolyte cell having a high working voltage in a low temperature range of 0° C. or below and thereby attaining excellent low temperature discharge characteristics, a reduced internally-generated gas, and an excellent safety against heat. This is achieved by a cell comprising a non-aqueous electrolyte containing propylene carbonate and $LiN(SO_2C_2F_5)_2$ as an electrolyte salt, a graphite negative electrode, and a positive electrode having a positive electrode active material comprising a Ti-attached LiCoO$_2$ in which a particle of titanium and/or titanium compound is attached on a surface of a particle of lithium cobalt oxide and a mole ratio of titanium and/or titanium compound in the Ti-attached LiCoO$_2$ is within the range of from 0.00001 to 0.02.

18 Claims, 11 Drawing Sheets

NON-AQUEOUS ELECTROLYTE CELL HAVING A POSITIVE ELECTRODE WITH TI-ATTACHED LICOO₂

BACKGROUND OF THE INVENTION (1) Field of the Invention

This invention relates to a non-aqueous cell comprising, in a cell case, a positive electrode having a positive electrode active material composed of lithium cobalt oxide, a negative electrode, and an electrolyte.

(2) Description of the Prior Art

In recent years, lithium ion cells have attracted attention as high capacity batteries. In such lithium ion cells, lithium cobalt oxides and lithium manganese oxides are used as a material for the positive electrode, and alloys or carbon materials are used for a negative electrode active material thereof Such lithium ion cells, however, have such drawbacks that, as charge-discharge cycles are repeated, a charge and discharge capacity and a charge and discharge efficiency are degraded.

Japanese Patent Publication No. 63-59507, for example, discloses a non-aqueous electrolyte cell in which $Li_xM_yO_2$ ('M' consists of Ni or Co, x<0.8, and y≈1) is used as a positive electrode active material and a lithium metal is used for the negative electrode, and this cell exhibits a high electromotive force of 4 V or higher and a high energy density. However, this cell as well has such drawbacks that a charge and discharge capacity is susceptible to degrading, and so forth. The reasons for such drawbacks seem to be that an irreversible change occurs in part of the crystal structure of the positive electrode active material, causing deterioration in the capability of absorbing and releasing lithium ions, and that decomposition of the electrolytic solution or the like is caused by overcharge and overdischarge that exceed an appropriate electric potential range, inducing a shortage of the electrolytic solution, undesirable effects by the decomposed matter, and so forth. In view of this drawback, a technique to replace part of the crystal of the positive electrode active material with other types of metallic elements has been suggested as a means to prevent such undesirable phenomena from occurring.

For example, Japanese Unexamined Patent Publication Nos. 4-329267 and 5-13082 disclose a battery using a positive electrode active material in which a titanium compound is added to a lithium cobalt oxide in a state of solid solution.

In addition, Japanese Unexamined Patent Publication No. 4-319260 discloses a battery using a positive electrode active material in which a zirconium is added to a lithium cobalt oxide in a state of solid solution.

Also, Japanese Unexamined Patent Publication No. 4-253162 discloses a battery using a positive electrode active material in which a one element selected from lead, bismuth, and boron is added to a lithium cobalt oxide in a state of solid solution.

The techniques as listed above can improve the problems as described above, but on the other hand, they induce other drawbacks, such that an initial capacity of the cell is reduced, and that a temperature at which the positive electrode active material starts to generate heat is lowered and thereby safety of the cell is degraded.

As portable appliances such as portable computers and mobile phones have increasingly become popular in the market, a need for a cell having an excellent low-temperature cycle characteristic and increased safety is accordingly growing. In addition, in order to further reduce sizes and weight of batteries, a thin type sealed cell in which a power-generating component is enclosed in a cell case composed of a flexible and lightweight laminated material (such a cell case is hereinafter also referred to as a "laminated container") has been developed. However, such a laminated container has a small strength against a cell internal pressure, and therefore easily expands when an internal gas is formed in the cell, causing problems such as deformation of the cell, leakage of the electrolyte, and rupture of the cell. For this reason, particularly in such a thin type cell, a positive electrode active material that can reduce an internal gas formation is desired.

SUMMARY OF THE INVENTION

In view of the foregoing problems and drawbacks in prior art, it is an object of the present invention to provide a non-aqueous electrolyte cell having a high working voltage, excellent low-temperature discharge characteristics, a reduced internal gas generation, and an increased safety.

This and other objects are accomplished in accordance with the present invention, by providing a non-aqueous electrolyte cell comprising in a cell case a positive electrode having a positive electrode active material composed of a lithium cobalt oxide, a negative electrode, and an electrolyte comprising a non-aqueous solvent, the positive electrode active material comprising a Ti-attached $LiCoO_2$ in which a particle of a titanium and/or a titanium compound is attached on a surface of a particle of the lithium cobalt oxide.

In the Ti-attached $LiCoO_2$ having such a configuration as described above, titanium particles and/or titanium compound particles are attached on at least a surface of lithium cobalt oxide, and the titanium particles and/or titanium compound particles serve to decompose a film derived from the non-aqueous solvent (the film is formed such as to surround the positive electrode active material), or to facilitate the exfoliation of the formed film. Therefore, according to the configuration as described above, degradation of discharge performance caused by a poor ionic conductivity can be suppressed, and consequently a significant decrease in discharge capacity under low temperature can be avoided. Note here that in the case of prior art positive electrode active materials, a surface of the positive electrode active material is surrounded by a film derived from a non-aqueous solvent, inhibiting the contact between the active material particles and the electrolyte. Therefore, in the case of prior art positive electrode active materials, the discharge performance is significantly degraded under a low temperature environment of 0° C. or lower, where the ionic conductivity is low.

Moreover, according to the configuration as described above, not only do the titanium particles and/or titanium compound particles, which are present on the surface of the lithium cobalt oxide, serve to facilitate the charge-discharge reaction, but also serve to inhibit decomposition of the electrolytic solution, thereby suppressing formation of internal gas.

Furthermore, the Ti-attached $LiCoO_2$ has a higher temperature point at which heat is generated, when compared to titanium-lithium cobalt oxide in a form of solid solution. Therefore, by employing the Ti-attached $LiCoO_2$, it is made possible to provide cell having an improved safety compared to the case where the titanium-lithium cobalt oxide in a form of solid solution is employed.

In the above-described configuration of the non-aqueous electrolyte cell, it is preferable that a mole ratio in the Ti-attached $LiCoO_2$ of the titanium and/or the titanium compound to the lithium cobalt oxide be in the range of from 0.00001 to 0.02, and more preferably be in the range of from 0.00001 to 0.01.

When the mole ratio x is restricted to be $0.00001 \leq x \leq 0.02$, a working voltage and a discharge capacity at a low temperature of 0° C. or below can be remarkably increased without substantially decreasing a discharge capacity at room temperature. Moreover, when the mole ratio (x) is restricted to be $0.00001 \leq x \leq 0.01$, the decrease of the discharge capacity at room temperature can be further lessened, and thus the low-temperature discharge characteristics are further improved. It is noted here that if the mole ratio x is less than 0.00001, the low-temperature discharge characteristics cannot be sufficiently improved. If the mole ratio x is more than 0.02, no further improvement in the low-temperature discharge characteristics is observed, and the discharge characteristics under room temperature are deteriorated. Hence, the mole ratio x is preferable to be $0.00001 \leq x \leq 0.02$, and more preferably be $0.00001 \leq x \leq 0.01$.

Further, in the above-described configuration of the non-aqueous electrolyte cell, the titanium compound may be titanium oxide and/or lithium-titanium complex oxide. Such compounds as well achieve the same effects as attained by the titanium compound. An example of the lithium-titanium complex oxide includes a lithium titanium oxide.

Further, in the above-described configuration of the non-aqueous electrolyte cell, the electrolyte may contain a mixed solvent composed mainly of ethylene carbonate.

Ethylene carbonate has a high permittivity and therefore is an ideal non-aqueous solvent. In addition, a film derived from the ethylene carbonate is easily decomposed by the catalytic action by titanium, and therefore it is unlikely to result in such a film that inhibits the contact between the positive electrode active material and the electrolyte. Hence, when a cell uses an electrolyte comprising a mixed solvent composed mainly of ethylene carbonate, transfer of ions at the interface of the positive electrode active material is performed smoothly, thus effectively preventing the discharge performance in a low temperature range from deteriorating.

Further, in the above-described configuration of the non-aqueous electrolyte cell, the electrolyte may contain an imide salt represented by the structural formula $LiN(SO_2C_2F_5)_2$.

$LiN(SO_2C_2F_5)_2$ does not generates much hydrogen fluoride (HF), and therefore, the effect of the side reaction derived from $LiN(SO_2C_2F_5)_2$ is little, thus making it possible to reduce the amount of generated gas under a state of a high electric potential or a high temperature.

In the above-described configuration of the non-aqueous electrolyte cell, the electrolyte may comprise a mixed solvent containing ethylene carbonate and diethyl carbonate.

Ethylene carbonate and diethyl carbonate exhibit a high degree of chemical stability. Therefore, by employing a mixed solvent containing these solvents as an electrolyte component, the amount of generated gas can be reduced. In particular, when the electrolyte comprises the mixed solvent containing these solvents and, as an electrolyte salt, $LiN(SO_2C_2F_5)_2$, the amount of generated gas can be remarkably reduced.

In the above-described configuration of the non-aqueous electrolyte cell, the electrolyte may be a gel type solid polymer electrolyte.

Generally, ionic conductivity at the interface of the positive electrode active material declines as a temperature goes down, and this tendency becomes more apparent in the case of gel type electrolytes. However, as previously mentioned, when a cell employs the Ti-attached $LiCoO_2$ in which titanium oxide or the like is added to lithium cobalt oxide, titanium oxide or the like serves to facilitate the transfer of ions at the interface of the active material particles, thereby preventing a significant decrease in the discharge capacity in a low temperature range. Hence, the advantageous effects by employing the Ti-attached $LiCoO_2$ as a positive electrode active material are more apparent in the case of a cell employing a gel type solid polymer electrolyte.

In the above-described configuration of the non-aqueous electrolyte cell, the cell case may be composed of a laminated material in which an aluminum film and a resin film are laminated.

Since such a laminated material is lightweight and flexible, thin and lightweight sealed cells can be efficiently manufactured by employing a cell case composed of a laminated material. However, such a cell case has such drawbacks that such a case can be easily deformed in the case where a cell internal pressure is generated, resulting in leakage of the electrolyte and rupture of the cell. By using the Ti-attached $LiCoO_2$ as a positive electrode active material, such drawbacks of the cell case composed of a laminated material can be overcome. In the case of the cell case composed of a laminated material, it is more preferable that the cell employs Ti-attached $LiCoO_2$ as a positive electrode active material, and an electrolyte comprising a mixed solvent containing $LiN(SO_2C_2F_5)_2$ and ethylene carbonate. With this configuration, as has been described above, the amount of generated internal gas is remarkably reduced, and therefore, the rupture of the cell or the leakage of the electrolyte does not occur easily even when the cell case composed of a laminated material is employed. In other words, this configuration achieves a thin type sealed cell having excellent reliability and safety.

In addition, in all the above-described configurations of the non-aqueous electrolyte cell, the negative electrode active material may be a graphite capable of absorbing and releasing lithium ions.

The negative electrode employing a graphite as an active material can achieve a larger discharge capacity than a negative electrode using coke can, particularly under low-temperature.

The non-aqueous electrolyte cell according to the present invention can be produced by a method of producing a non-aqueous electrolyte cell comprising in a cell case a positive electrode having a positive electrode active material composed of a lithium cobalt oxide, a negative electrode, and an electrolyte comprising a, non-aqueous solvent, the method comprising the step of:

producing a positive electrode active material by preparing a Ti-attached lithium cobalt oxide in which a titanium oxide particle and/or a metallic titanium particle is attached on a surface of a lithium cobalt oxide particle, such that a lithium cobalt oxide powder is mixed with a titanium oxide powder and/or a metallic titanium powder, and thereafter the mixture is baked.

It is to be noted here that the Ti-attached lithium cobalt oxide of the present invention is intended to represent such a substance that a titanium particle and/or a metallic titanium particle is attached to or bonded with the surface of a lithium cobalt oxide particle, which is a main substance of the positive electrode active material. According to the above-described method, such a Ti-attached lithium cobalt oxide is produced with a high productivity.

In the above-described method, a lithium-titanium complex oxide may be used in place of the titanium oxide powder and/or the metallic titanium powder.

In addition, the above-described producing method may be such a method as in the following. Specifically, the step of preparing a positive electrode active material may comprise the steps of:

preparing a titanium-compound-mixed cobalt oxide by baking a cobalt oxide powder and a titanium oxide powder and/or a metallic titanium powder, crushing and grinding the titanium-compound-mixed cobalt oxide into a powdered state, preparing a Ti-attached lithium cobalt oxide in which a particle of titanium oxide and/or metallic titanium is attached on a surface of each lithium cobalt oxide particle, by mixing the powdered titanium-compound-mixed cobalt oxide with at least one lithium compound selected from the group consisting of lithium hydroxide, lithium carbonate, and lithium nitrate, and then baking the mixture.

According to such a method comprising these steps, Ti-attached $LiCoO_2$ can be produced with a low cost.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Example 1

Preparation of Positive Electrode

Figure 1:
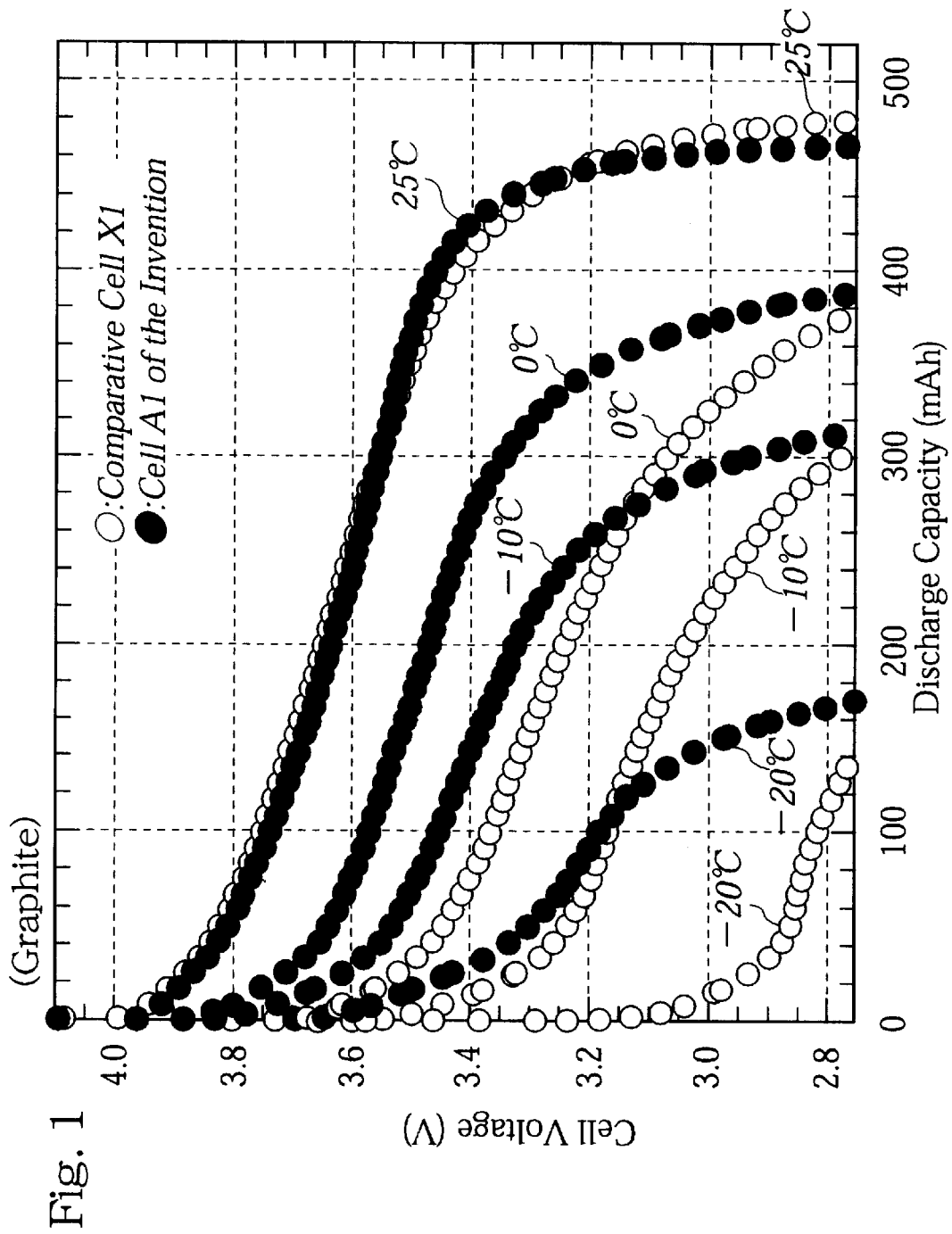
FIG. 1 is a graph illustrating the relationship between a cell voltage and a discharge capacity in a cell A1 of the present invention and a comparative cell X1 of the comparative example.

A lithium cobalt oxide having a particle diameter of 2–10 $\mu$m was mixed with a titanium oxide having a particle diameter of 5 $\mu$m or less so that a mole ratio x of the titanium to the lithium cobalt oxide (hereinafter referred to as a "mole ratio x") became 0.01. Thereafter, the mixture was baked at 800° C. in an atmosphere in which a partial pressure of oxygen is restricted at 10–30% (an oxygen partial pressure restricted atmosphere), and then cooled down to a room temperature. Thereafter, the baked material was crushed and ground to form a positive electrode active material in a powdered state. An average particle diameter of the formed positive electrode active material was 3–15 $\mu$m.

Following this, the positive electrode active material, a carbonic conductivity enhancer, a graphite, and a fluoride resin type binder were mixed with a ratio of 90:3:2:5 respectively, and a positive electrode mixture was thus prepared. The prepared positive electrode mixture was coated onto both sides of an aluminum foil and then dried, and the coated foil was rolled. Thus, a positive electrode was prepared.

It is noted that, in mixing the lithium cobalt oxide and titanium oxide, a method such that a mixture is uniformly mixed with a high mixing ratio at the initial stage and gradually the ratio of dilution is raised (so-called a masterbatch method) was employed. This method permits a homogeneous mixing of titanium oxide even when the amount of the titanium oxide is very small. In addition, although titanium oxide $TiO_2$ was used in this example, other titanium compounds may be used in place of the titanium oxide, and metallic titanium may also be used.

Preparation of Negative Electrode

A graphite (interlayer distance $_{002}$=3.35–3.37 Å) was used to a negative electrode active material, and an appropriate amount of a fluoride resin as a binder was added to the graphite, and the material was mixed to form a negative electrode mixture. The negative electrode mixture was then coated onto both sides of a copper foil and then dried, and the coated foil was rolled. Thus, a negative electrode was prepared.

Assembling of Cell

A lead was attached to each of the positive and negative electrodes prepared according to the above-described manner, and a separator made of polypropylene was sandwiched between the positive and negative electrodes. The electrodes and separator were coiled in a spiral form to prepare a spirally-wound electrode assembly. The spirally-wound electrode assembly was place into a cell case made of steel. Thereafter, the cell case was filled with an electrolytic solution, and the opening of the cell case was filled with an electrolytic solution, and the opening of the cell case was sealed. Thus, a cell A1 of Example 1 according to the present invention was prepared. The cell capacity of this cell A1 was 480 mAh.

The above-mentioned electrolytic solution was such that lithium hexaflorophosphate ($LiPF_6$) was dissolved in a mixed solvent of an equal volume of ethylene carbonate (EC) and diethyl carbonate (DEC), so that a ratio of the $LiPF_6$ is 1 mol/liter.

Example 2

A cell A2 of Example 2 according to the present invention was prepared in the same manner as in Example 1, except that coke (interlayer distance $d_{002}$=3.40–3.45 Å) was employed as a negative electrode active material in place of the graphite used in Example 1.

Example 3

A cell A3 of Example 3 according to the present invention was prepared in the same manner as in Example 1, except that coke was employed as a negative electrode active material in place of the graphite used in Example 1, and that a mixed solvent of an equal volume of propylene carbonate (PC) and diethyl carbonate (DEC) was employed in place of the mixed solvent of an equal volume of ethylene carbonate (EC) and diethyl carbonate (DEC).

Example 4–7

Cells A4 to A7 of Examples 4 to 7 according to the present invention were prepared in the same manner as in Example 1, except that the mole ratios x were set to be 0.00001, 0.0001, 0.02, and 0.03 respectively.

Comparative Example 1

A comparative cell X1 of Comparative Example 1 was prepared in the same manner as in the above-described Example 1, except that the mole ratio x was set to be 0 (no titanium oxide was added).

Comparative Example 2

A comparative cell X2 of Comparative Example 2 was prepared in the same manner as in the above-described Comparative Example 1, except that coke was employed as a negative electrode active material in place of the graphite used in Comparative Example 1.

Comparative Example 3

A comparative cell X3 of Comparative Example 3 was prepared in the same manner as in the above-described Comparative Example 1, except that coke was employed as a negative electrode active material in place of the graphite used in Comparative Example 1, and that a mixed solvent of an equal volume of PC and DEC was employed in place of the mixed solvent of an equal volume of EC and DEC.

Comparative Example 4

A comparative cell X4 of Comparative Example 4 was prepared in the same manner as in the above-described Example 1, except that titanium was inserted in $LiCoO_2$ to form a solid solution.

Specifically, the positive electrode active material was prepared according to the manner described in Japanese Unexamined Patent Publications 4-329267 and 5-13082, such that by using a titanium coupling agent, titanium was added to lithium cobalt oxide to form a solid solution. The resulting solid solution is a complex oxide represented as $LiCo_{1-x}Ti_xO_2$.

Comparative Example 5–7

Comparative cells X5, X6, and X7 of Comparative Examples 5, 6, and 7 were prepared in the same manner as in the above-described Example 1, except that the mole ratios x were set to be 0.05, 0.1, and 0.000001 ($1\times10^{-6}$) respectively.

Experiment 1

Figure 2:
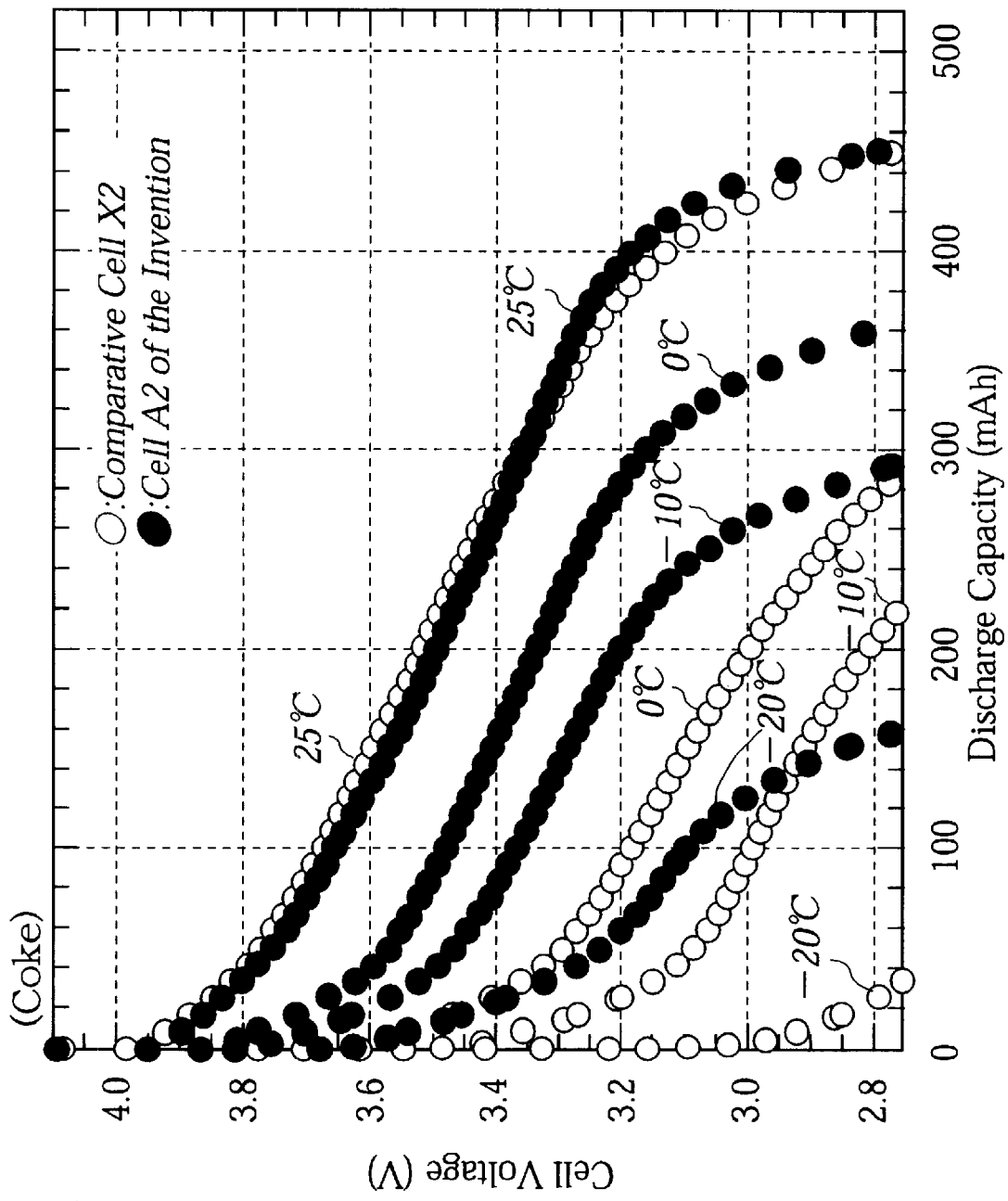
FIG. 2 is a graph illustrating the relationship between a cell voltage and a discharge capacity is a cell A2 of the present invention and a comparative cell X2 of the comparative example.
Figure 3:
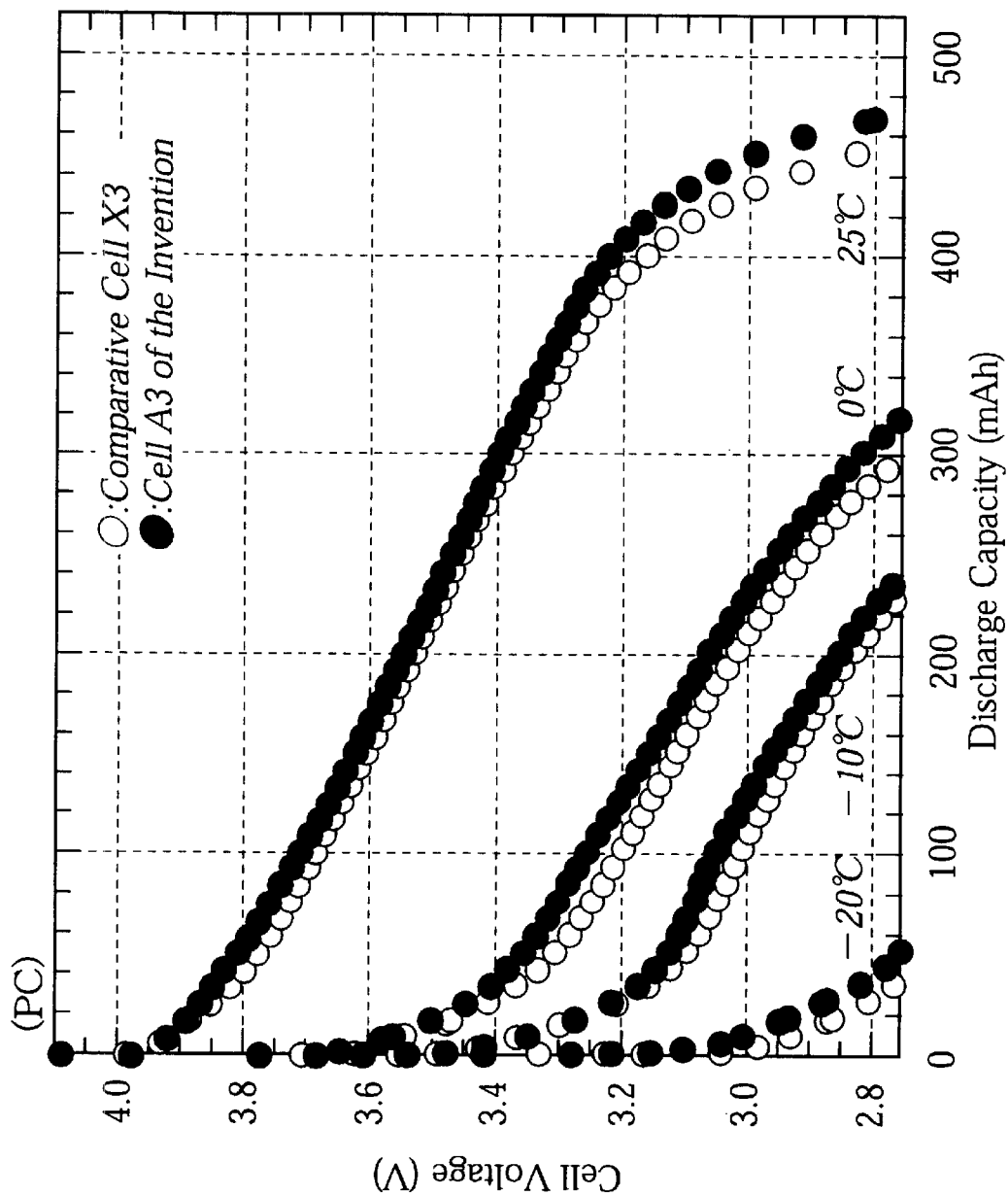
FIG. 3 is a graph illustrating the relationship between a cell voltage and a discharge capacity is a cell A3 of the present invention and a comparative cell X3 of the comparative example.

The cells A1–A3 of the present invention and the comparative cells X1–X3 were subjected to a constant current charge and discharge test at temperatures of $-20°$ C., $-10°$ C., $0°$ C., and $25°$ C. The results are shown in FIGS. 1–3. The conditions of the charge and discharge were that the cells were first charged at a charge current of 480 mA (1C) until an end-of-charge voltage of 4.1 V was reached, and thereafter the cells were, discharged at a discharge current of 480 mA (1C) until an end-of-discharge voltage of 2.75 V was reached.

It will be understood from FIGS. 1–3 that, in the comparison between the cells of the present invention, the discharge characteristics thereof are ranked as A1>A2>A3. In addition, from the comparison of the cell A1 with the comparative cell X1 in FIG. 1, and the comparison of the cell A2 with the comparative cell X2 in FIG. 2, it will be understood that, in the cells of the present invention, in which titanium oxide powder is mixed in the positive electrode, working voltages (cell voltage) in a low temperature range of $-20°$ C. to $0°$ C. are remarkably improved over those of the comparative cells, in which no titanium oxide is used.

Further, from the comparison of FIGS. 1 and 2 (in which the electrolytic solution is EC/DEC) with FIG. 3 (in which the electrolytic solution is PC/DEC), it will be understood that low-temperature discharge characteristics are remarkably improved in a system employing an electrolytic solution containing ethylene carbonate (EC), while very little improvement in the low-temperature discharge characteristics is observed in a system employing an electrolytic solution containing PC.

These results are considered to be attributed to the following reasons. In a cell in which a lithium cobalt oxide is used for the positive electrode active material and a solution containing such materials as EC and PC is used for the electrolytic solution, when a charge-discharge cycle is repeated, a film derived from decomposed materials and polymerized materials is formed on the surface of the positive electrode particles, and this film acts such that it hinders the transfer of electrons and ions on the surface of the active material particles. Thereby, a discharge performance is considerably degraded in a low temperature range, in which an ionic conductivity is low. However, in a positive electrode according to the present invention, in which titanium powder or titanium compound powder is mixed with a lithium cobalt oxide as a positive electrode active material, titanium or titanium compound particles are present on the surface of lithium cobalt oxide particles, and they function as a catalyst to promote decomposition or exfoliation of the film. That is to say, according to the present invention, the film is not easily formed on the surface of the particles of the positive electrode active material, and thereby it is made possible to greatly suppress the degradation of a working voltage in a low temperature range, in which an ionic conductivity is low.

However, such an effect of the titanium compound particles as a catalyst cannot be sufficiently exhibited for a film derived from PC. Therefore, it is considered that the improvement in discharge characteristics becomes small in the case of the electrolytic solution containing PC.

It is a well-known fact that when PC is used in a cell employing graphite as a negative electrode active material, graphite is decomposed by the charging and discharging operation. For this reason, the results of the experiment regarding such a cell employing a graphite negative electrode and PC are not shown herein.

In the above-described examples 1 through 7, Ti-attached $LiCoO_2$ was prepared by using titanium oxide powder and lithium cobalt oxide powder. In addition to this, the Ti-attached $LiCoO_2$ was produced by the methods (1) and (2) described below, and it has been confirmed that the same effects as described above are also obtained in the cells employing Ti-attached $LiCoO_2$ prepared by the methods (1) and (2) below.

(1) A titanium oxide powder with a particle diameter of 5 $\mu$m or less was mixed with a cobalt oxide powder with an average particle diameter of 2–10 μm, and thereafter, the mixture was baked at 600° C. in an atmosphere. Then, the baked material was cooled down, and crushed and ground to prepare a titanium-compound-mixed cobalt oxide powder. Thereafter, the titanium-compound-mixed cobalt oxide powder was mixed with LiOH as a lithium source, and the mixture was baked at 800° C. in an atmosphere in which a partial pressure of oxygen is restricted at 10–30% (an oxygen partial pressure restricted atmosphere). Thereafter, the baked matter was gradually cooled down to a room temperature, and then crushed and grounded. Thus, a Ti-attached $LiCoO_2$ having a particle diameter of approximately 3–15 μm was produced.

(2) A lithium-titanium complex oxide was mixed with a lithium cobalt oxide, and thereafter the mixture was baked at 800° C. in an oxygen partial pressure restricted atmosphere, then gradually cooled down to a room temperature, and then crushed. Thus, a Ti-attached $LiCoO_2$ having a particle diameter of approximately 3–15 μm was produced.

Experiment 2

Regarding the cell A1 of the present invention and the comparative cell X4 (a cell employing, for the positive electrode active material, a complex oxide in which part of cobalt is substituted by titanium), 5 mg of the positive electrode active material was collected from each of the cells after the cells were fully charged. Then, 2 ml of EC was added to each of the collected positive electrode materials, and each of the samples was hermetically sealed into a DTA sample cell. The sample cells were subjected to a differential thermal analysis (DTA). The results are shown in FIG. 4.

Figure 4:
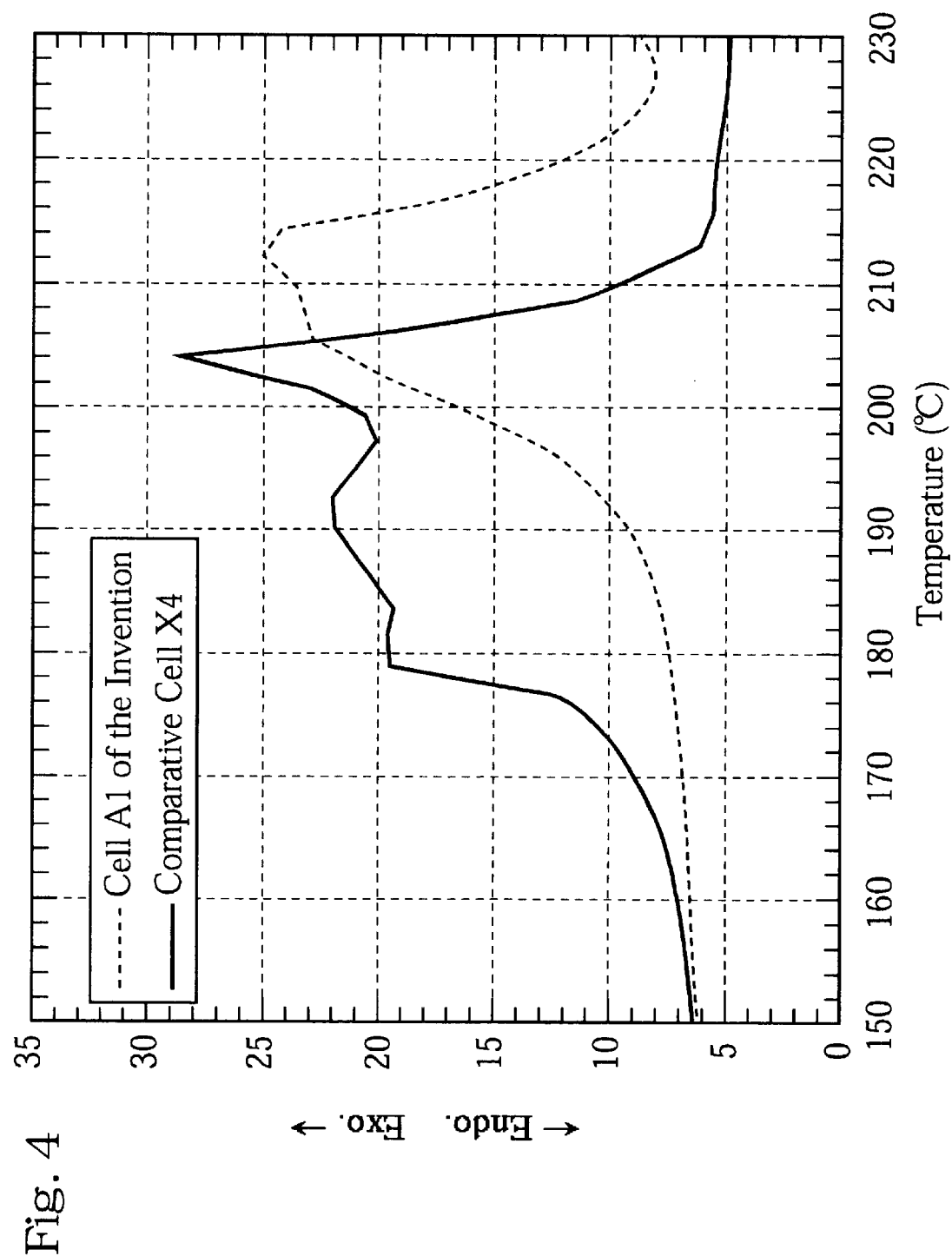
FIG. 4 is a DTA chart for a positive electrode active material used for the cell A1 of the present invention and that used for the comparative cell X1 of the comparative example.

As apparent from FIG. 4, a temperature at which an exothermic reaction starts in the cell was lower in the positive electrode active material used in the comparative cell X4, compared to the positive electrode active material of the cell A1 of the present invention. This indicates that the positive electrode active material in which titanium is present in lithium cobalt oxide in the state of solid solution has a possibility of starting fire at a much lower temperature. Therefore, a cell employing such an active material has a lower degree of safety.

By contrast, the DTA chart of the cell A1 resulted in the same as the DTA chart of lithium cobalt oxide per se (not shown), and this confirms that no such phenomenon that a starting point of an exothermic reaction is shifted to a lower temperature side by addition of titanium oxide, occurred in the cell A1. This shows that a method of attaching titanium particles to lithium cobalt oxide is superior to a method of making a solid solution of lithium cobalt oxide and titanium from the viewpoint of safety of a cell. Note that it has been confirmed by an experiment that the same results as described above can be obtained when the mole ratio x is within the range of $0.00001 \leq x \leq 0.05$, although it is not shown in FIGS. 1 to 4.

Experiment 3

Figure 5:
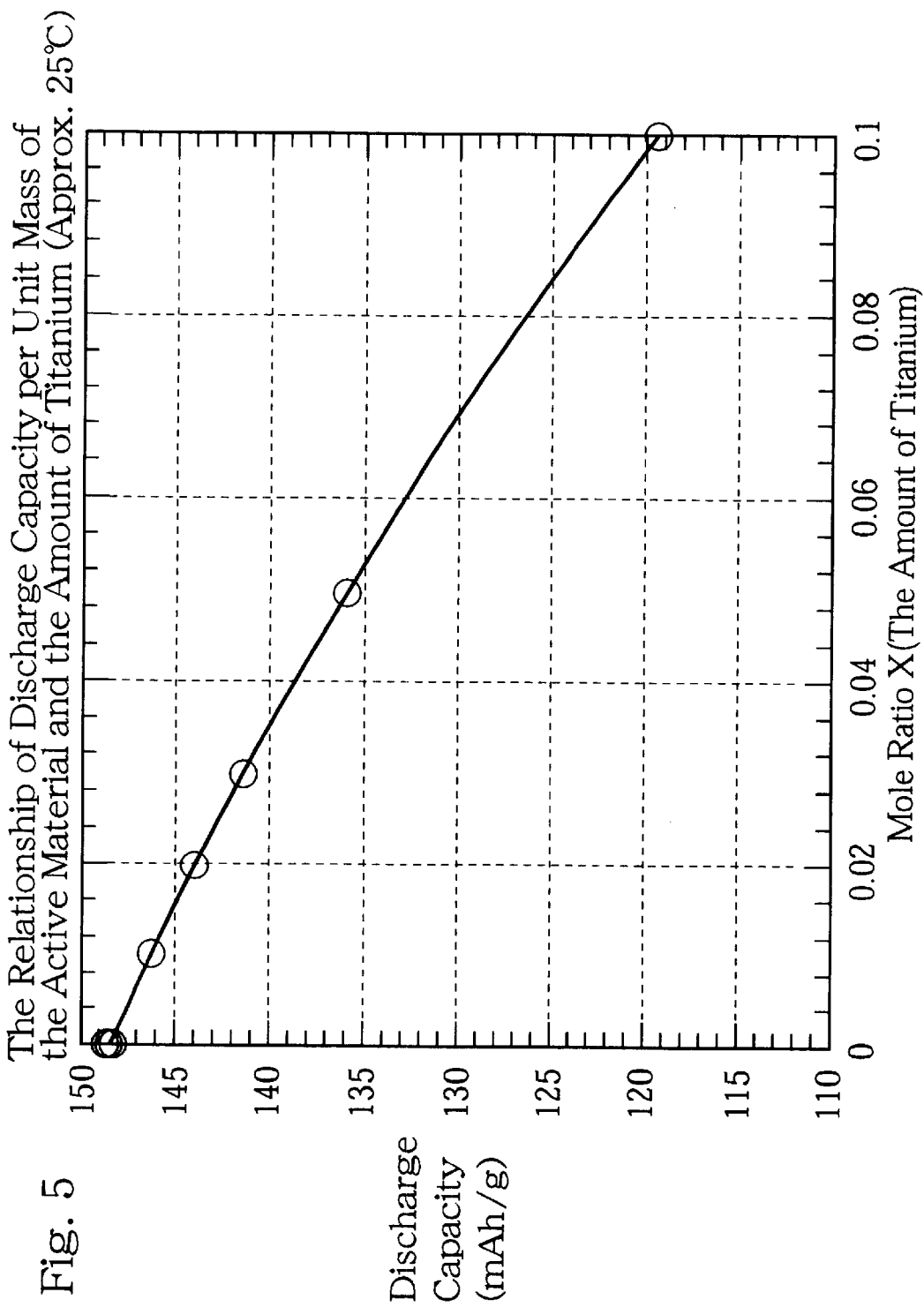
FIG. 5 is a graph illustrating the relationship between a mole ratio x and a discharge capacity of a positive active material per unit weight (at 25° C.).
Figure 6:
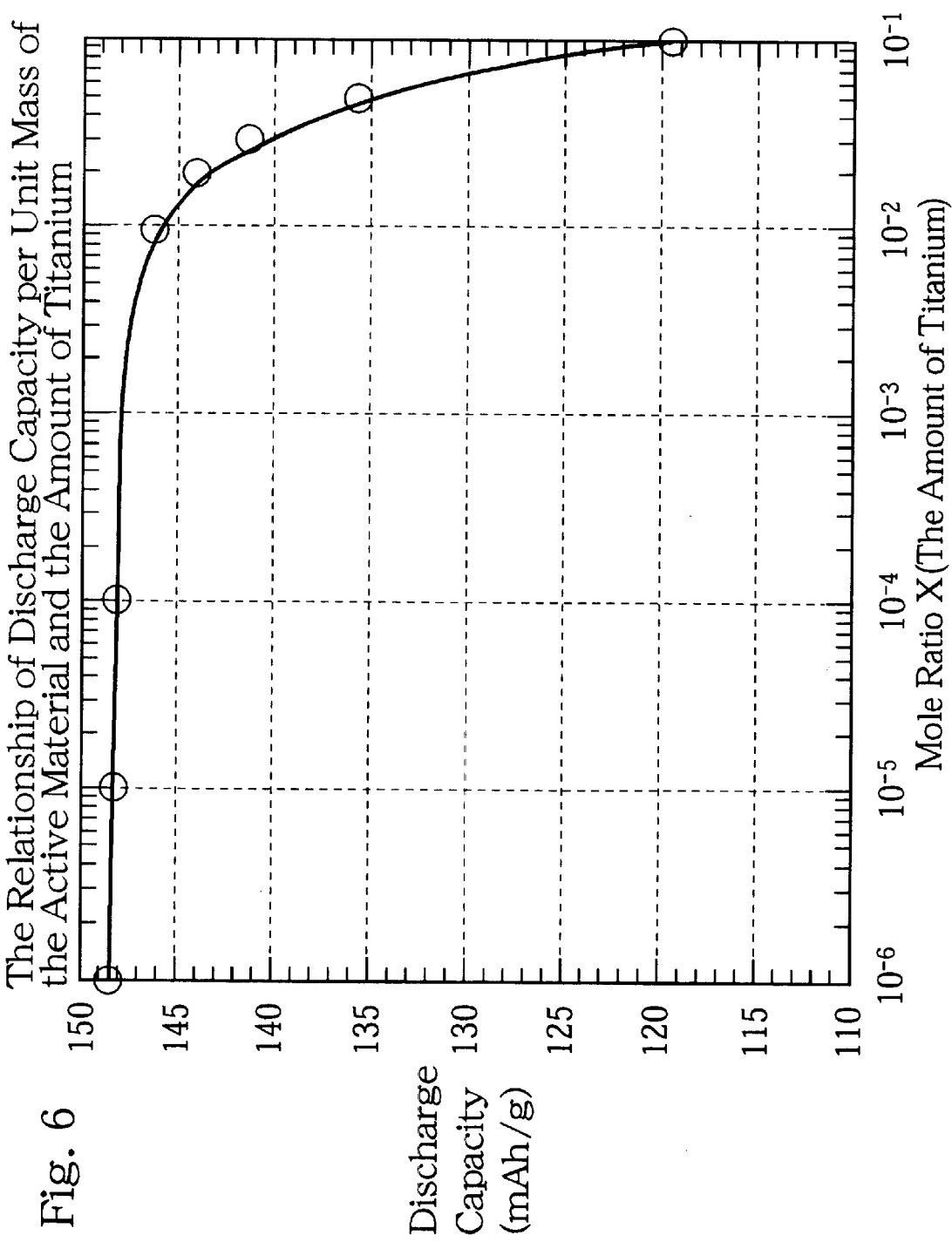
FIG. 6 is a graph illustrating the relationship between a mole ratio x and a discharge capacity of a positive active material per unit weight (at 25° C.).

Nine types of positive electrodes were prepared from nine types of positive electrode active materials each having a mole ratio x of 0, 0.000001 ($1 \times 10^{-6}$), 0.00001 ($1 \times 10^{-5}$), 0.0001 ($1 \times 10^{-4}$), 0.01 ($1 \times 10^{-2}$), 0.02 ($2 \times 10^{-2}$), 0.03 ($3 \times 10^{-2}$), 0.05 ($5 \times 10^{-2}$), or 0.1 ($1 \times 10^{-1}$). Each of these positive electrodes and a reference electrode composed of metallic lithium were soaked in an electrolytic solution having the same composition as the electrolytic solution shown in the Example 1 above, and the mole ratio x (the amount of titanium compound to be added) and a discharge capacity per unit mass of the positive electrode active material were examined under room temperature (approximately 25° C.). The results are shown in FIGS. 5 and 6. It is to be noted that the above-described nine types of positive electrodes correspond to the positive electrodes employed in the comparative cells X7 and X1, the cells A4, A5, A1, A6, and A7 of the present invention, and comparative cells X5 and X6, respectively.

As seen from FIG. 5, it is recognized that, as the mole ratio x, i.e., the amount of titanium oxide to be added is increased, the discharge capacity tends to decrease. From FIG. 6, it is recognized that when the mole ratio x exceeds 0.01, a rate of decreasing in the discharge capacity increases.

It is considered that the results in FIGS. 5 and 6 are due to the fact that when the amount of titanium oxide, which is not an active material, is increased, an energy density of the positive electrode active material decreases. From these results, it will be understood that it is necessary that the amount of titanium oxide to be added (the mole ratio x) be within such a range that the energy density of the positive electrode active material is not significantly decreased.

Experiment 4

Regarding the cells A1, A4, A5, A6, and A7 of the present invention, and the comparative cells X1, X5, X6, and X7, a discharge capacity of each of the cells was measured at −10° C. and at −20° C. to examine the relationship of the mole ratio x and the low-temperature discharge characteristics of the cells. The measurement of the discharge capacity was performed in the same manner as described in the Experiment 1 above, except that the end-of-discharge voltage was set to be 3.1 V.

Figure 7:
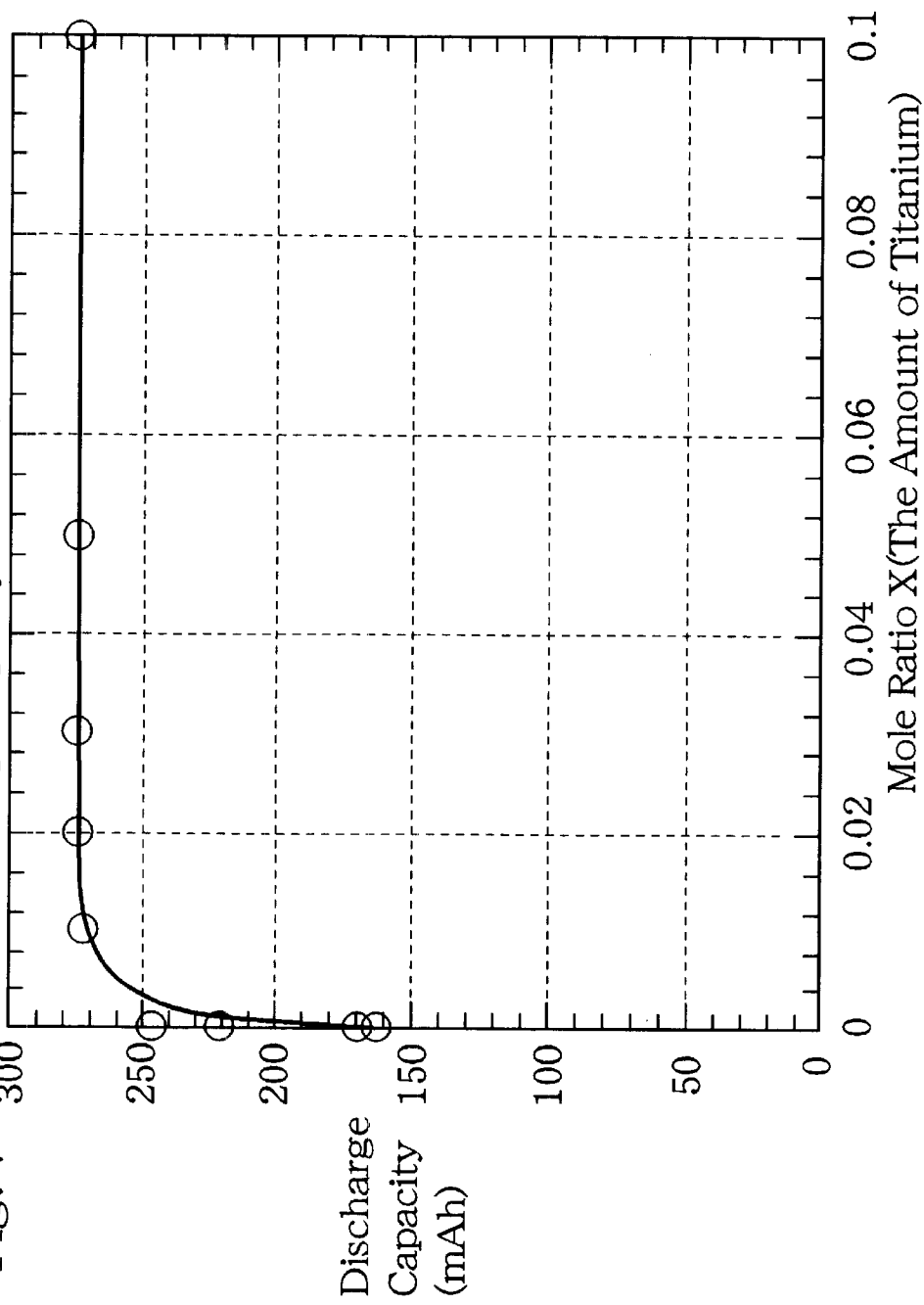
FIG. 7 is a graph illustrating the relationship between a mole ratio x and a discharge capacity at −10° C.
Figure 8:
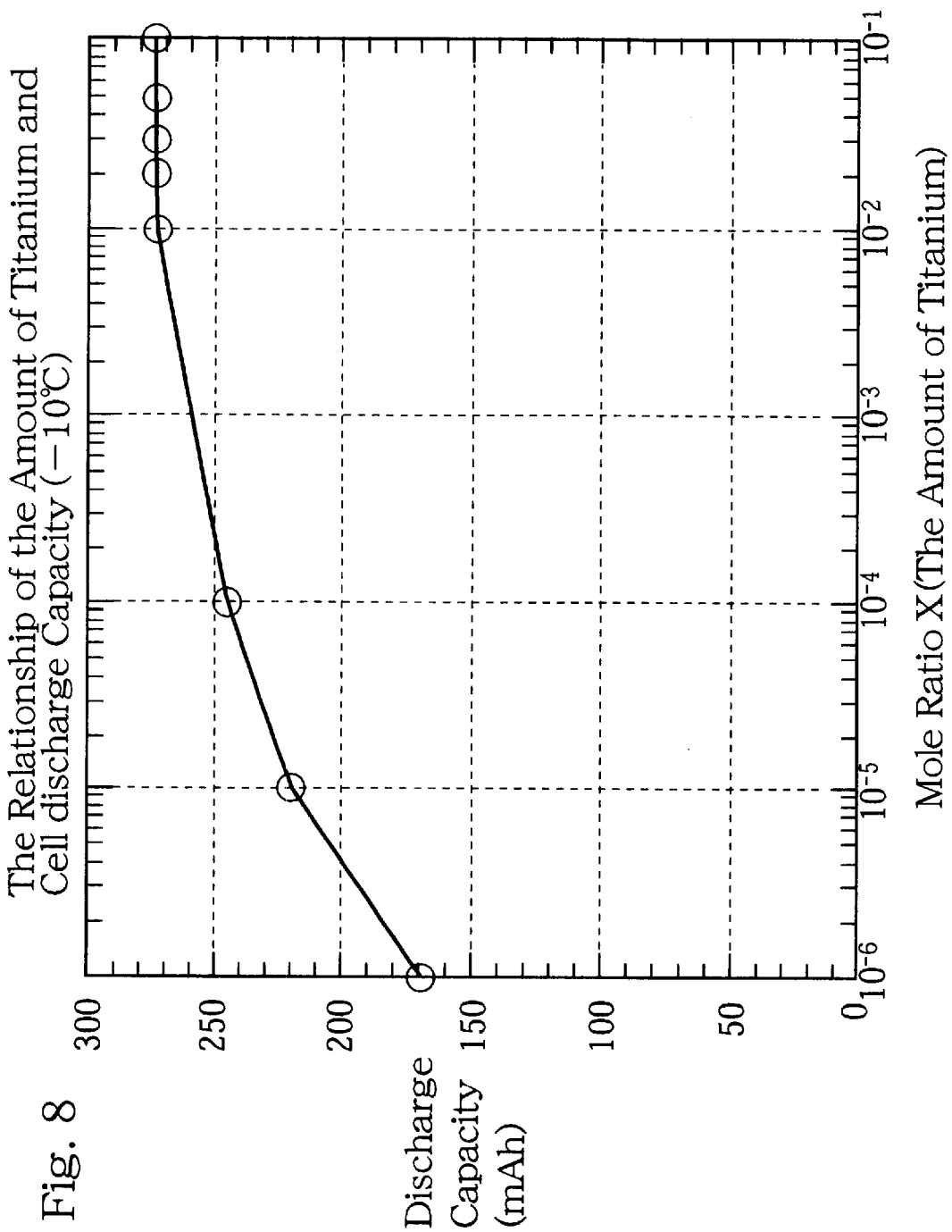
FIG. 8 is a graph illustrating the relationship between a mole ratio x and a discharge capacity at −10° C.
Figure 9:
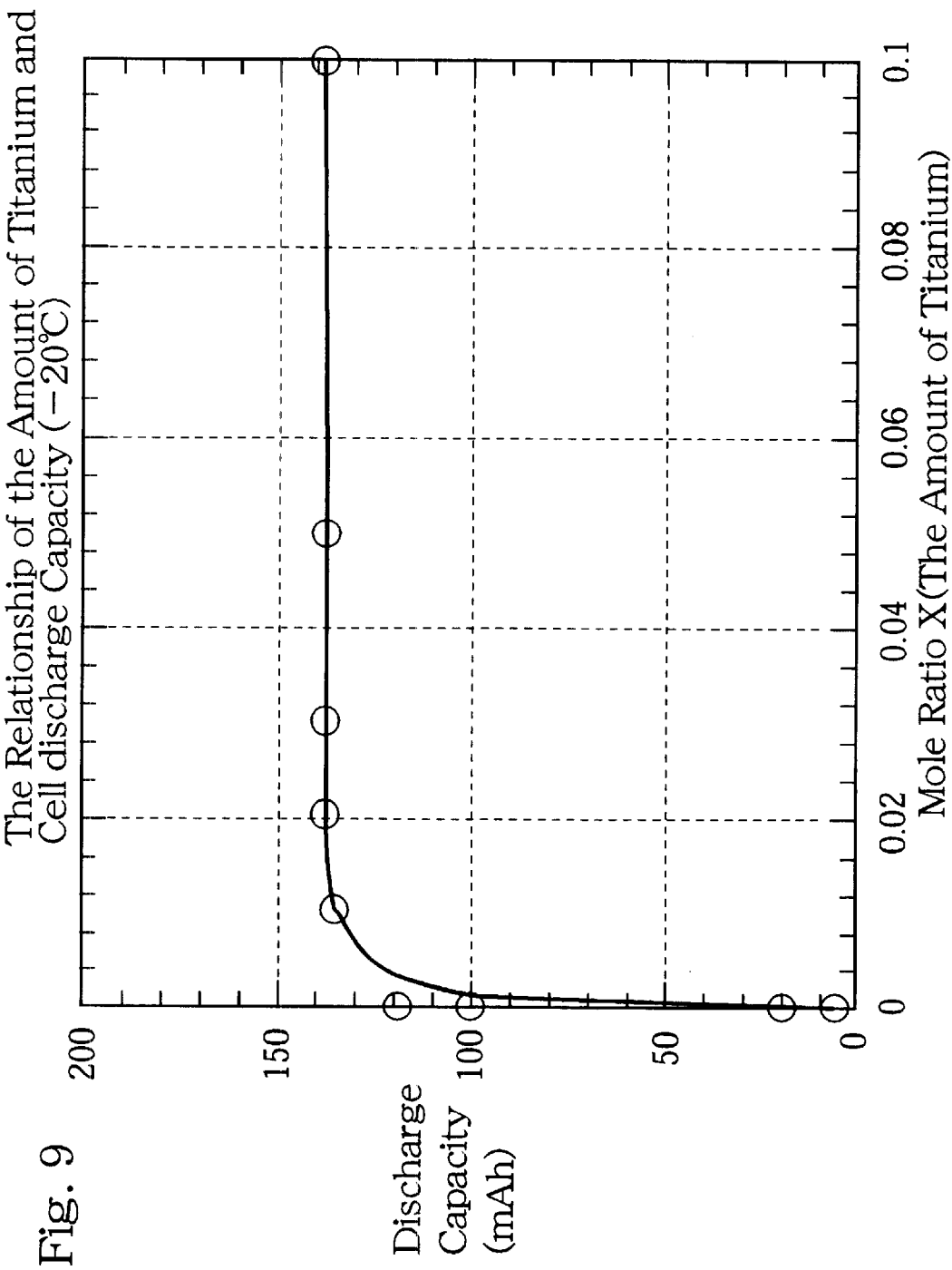
FIG. 9 is a graph illustrating the relationship between a mole ratio x and a discharge capacity at −20° C.
Figure 10:
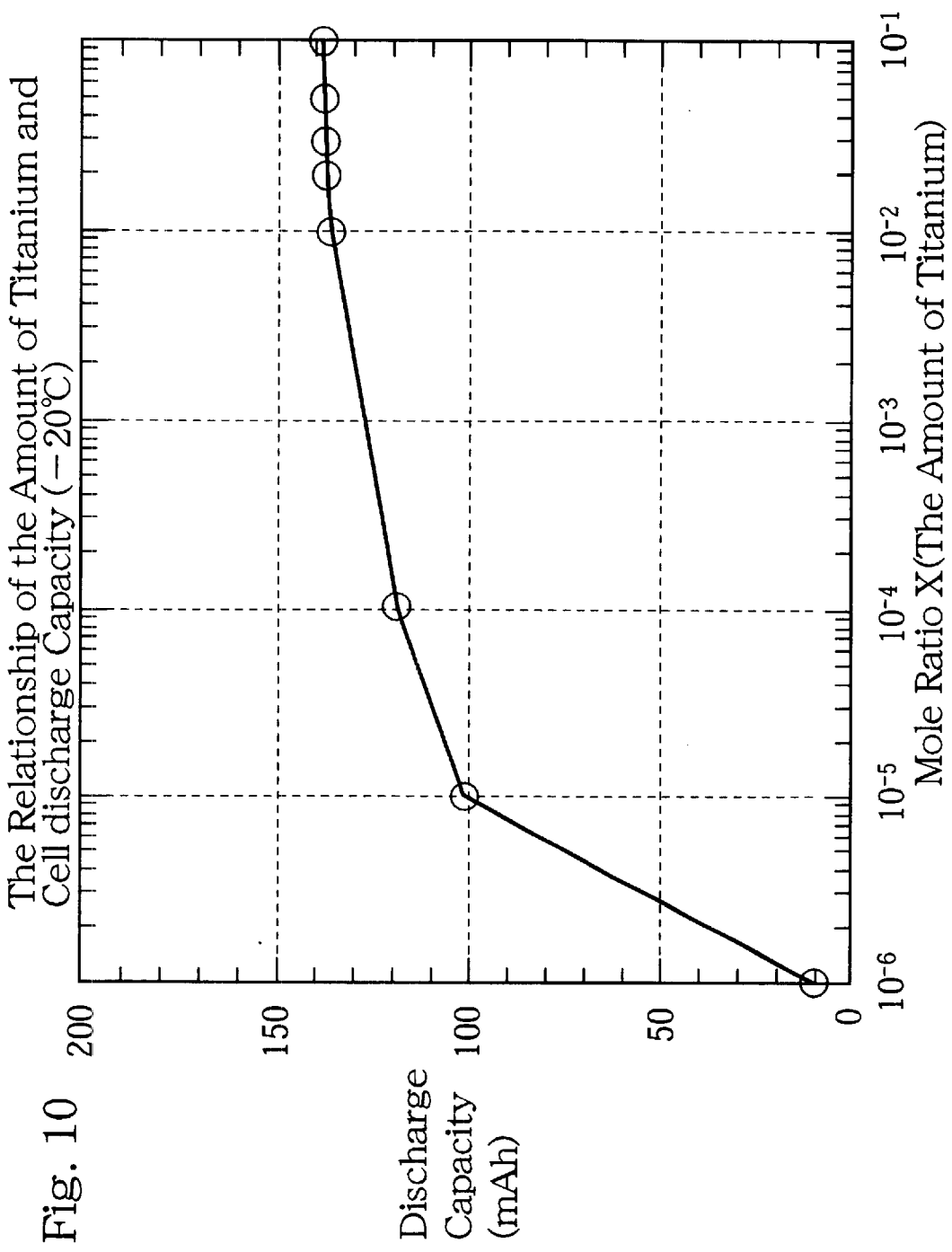
FIG. 10 is a graph illustrating the relationship between a mole ratio x and a discharge capacity at −20° C.

The results of the measurement at −10° C. are shown in FIGS. 7 and 8, and the results of the measurement at −20 C. are shown in FIGS. 9 and 10. As apparent from the comparison between FIG. 7 (−10° C.) and FIG. 9 (−20° C.), and from the comparison between FIG. 8 (−10° C.) and FIG. 10 (−20° C.), no difference was recognized between the patterns of the graphs, although the discharge capacities at −20° C. are smaller than those at −10° C. In addition, it was recognized that when the mole ratio x is 0.01 or smaller, the discharge capacity tends to decrease, showing that the results of this Experiment 4 are contrary to the results of the above-described Experiment 3 (the results obtained under room temperature). More specifically, FIG. 6, which depicts the discharge capacities under room temperature, shows that when the mole ratio x exceeds 0.01, the discharge capacity per unit mass drops sharply. By contrast, FIGS. 7 and 9, which depict the discharge capacities of the cells at −10° C. and at −20° C. respectively, show that when the mole ratio x is in the range of 0 to 0.01, the discharge capacity considerably increases, and that when the mole ratio x exceeds 0.02, no increase is observed.

In addition, in FIGS. 8 and 10, the discharge capacity under low temperature greatly decreases when the mole ratio x is less than $1 \times 10^{-5}$, and this tendency is more apparent at −20° C.

From the results described thus far, it is understood that, considering the low-temperature discharge characteristics, the preferable range of the mole ratio x should be in the range of from 0.00001 ($1 \times 10^{-5}$) to 0.02 ($2 \times 10^{-2}$), and more preferably, in the range of from 0.00001 to 0.01 ($1 \times 10^{-2}$). When the mole ratio x is in the above range, a cell having excellent low-temperature discharge characteristics can be achieved without unnecessarily reducing a mass energy density.

When normal conditions under which portable appliances and the like are used are taken into consideration, it is preferable that a discharge capacity of the cell be maintained at least 40% of the initial capacity (e.g., 480 mAh×0.4=192 mAh) in the case of −10° C., and at least 20% of the initial capacity (e.g., 480 mAh×0.2=96 mAh) in the case of −20° C. The reason is that, if the degradation of discharge performance of a cell is within such a range as specified above, portable appliances equipped with the cell will not fail to work immediately by normal fluctuation of temperature throughout a year. In FIGS. 8 and 10, it is understood that a range of a mole ratio x $\geqq 0.00001$ can satisfy this requirement.

The low-temperature discharge characteristics are sufficiently improved when the mole ratio x is 0.01 or larger, whereas the discharge capacity is reduced, contrary to the case of room temperature (see FIG. 6), when the mole ratio is less than 0.01. The reason is considered to be as follows. Under room temperature, the ionic conductivity of the electrolyte is good and, therefore, the effect of a decrease in an energy density per unit mass, caused by an increase in the amount of titanium oxide to be added, outweighs the contribution by the titanium oxide in a relative sense. On the contrary, under low temperature, the degree of the film derived from the solvent inhibiting the transfer of electrons and ions on the surface of the positive electrode active material is increased, and therefore, the advantageous effects by titanium oxide, such that it prevents the film from being formed, improves the ionic conductivity on the surface of the active material, and thereby contributes to an increase in the discharge capacity, outweigh the effect of reducing the energy density per unit mass. It is considered to be at a point (branch point) of a mole ratio x=0.01 or 0.02 that the degree of an energy density decrease by adding titanium oxide approximately equals to the degree of an actual discharge capacity increase by adding titanium oxide.

Experiment 5

Various types of cells were prepared with varying a material to be added to lithium cobalt oxide, a solvent for the electrolytic solution, and a solute for the electrolytic solution. The cells were preserved at 80° C. for 96 hours, and the amount of an internally-generated gas was studied. Tables 1 to 3 below list the conditions of the cell preparation and the amounts of the generated gas.

An electrolytic solution used for this experiment was such that each of the solutes was dissolved with a ratio of 1 mol/liter in a two-component-type mixed solvent of an equal volume of EC and another solvent. For the negative electrode, graphite was employed, and other conditions were the same as those in the foregoing Experiment 1.

TABLE 1

| Solute Solvent | | $LiN(SO_2C_2F_5)_2$ EC/DEC | $LiPF_6$ EC/DEC | $LiBF_4$ EC/DEC | $LiClO_4$ EC/DEC |
|---|---|---|---|---|---|
| $TiO_2$ added | Amount of Generated Gas | 1.9 ml | 3.7 ml | 3.9 ml | 4.3 ml |
| $SnO_2$ added | Amount of Generated Gas | 4.1 ml | 4.7 ml | 5.3 ml | 5.8 ml |
| $MgO_2$ added | Amount of Generated Gas | 4.7 ml | 5.3 ml | 6.1 ml | 6.8 ml |

TABLE 1-continued

| Solute Solvent | | $LiN(SO_2C_2F_5)_2$ EC/DEC | $LiPF_6$ EC/DEC | $LiBF_4$ EC/DEC | $LiClO_4$ EC/DEC |
|---|---|---|---|---|---|
| No additive | Amount of Generated Gas | 3.3 ml | 3.7 ml | 4.0 ml | 4.2 ml |

TABLE 2

| Solute Solvent | | $LiN(SO_2C_2F_5)_2$ EC/DMC | $LiPF_6$ EC/DMC | $LiBF_4$ EC/DMC | $LiClO_4$ EC/DMC |
|---|---|---|---|---|---|
| $TiO_2$ added | Amount of Generated Gas | 2.3 ml | 5.0 ml | 5.4 ml | 5.8 ml |
| $SnO_2$ added | Amount of Generated Gas | 5.6 ml | 6.3 ml | 7.2 ml | 7.8 ml |
| $MgO_2$ added | Amount of Generated Gas | 6.1 ml | 6.7 ml | 8.1 ml | 8.6 ml |
| No additive | Amount of Generated Gas | 4.5 ml | 4.9 ml | 5.5 ml | 5.8 ml |

TABLE 3

| Solute Solvent | | $LiN(SO_2C_2F_5)_2$ EC/EMC | $LiPF_6$ EC/EMC | $LiBF_4$ EC/EMC | $LiClO_4$ EC/EMC |
|---|---|---|---|---|---|
| $TiO_2$ added | Amount of Generated Gas | 2.1 ml | 4.3 ml | 5.0 ml | 5.3 ml |
| $SnO_2$ | Amount of Generated Gas | 5.4 ml | 5.9 ml | 6.7 ml | 7.4 ml |
| $MgO_2$ added | Amount of Generated Gas | 5.6 ml | 6.1 ml | 7.7 ml | 8.1 ml |
| No additive | Amount of Generated Gas | 4.2 ml | 4.5 ml | 4.9 ml | 5.1 ml |

As apparent from the above Tables 1 to 3, the formation of gas was recognized in all of the cells, but there were significant differences in terms of the degree of the formation of gas. More specifically, in relation to the material to be added, the amount of the generated gas was such that $TiO_2 \leqq$ no additive $< SnO_2 < MgO_2$ in ascending order. From this result, it is understood that $SnO_2$ and $MgO_2$ serve to increase the amount of the formed gas, whereas $TiO_2$ serves to suppress the formation of gas.

In relation to the types of solutes, the amount of the generated gas was such that $LiN(SO_2C_2F_5)_2 < LiPF_6 < LiBF_4 < LiClO_4$ in ascending order, irrespective of types of solvents. This indicates that $LiN(SO_2C_2F_5)_2$ is preferable as a solute.

In relation to the types of solvents, the amount of the generated gas was such that [EC/DEC]<[EC/DMC]<[EC/EMC] in ascending order. This indicates that [EC/DEC] is preferable as a solvent.

In summary, a preferable system is such that $TiO_2$ is selected as a material to be added, $LiN(SO_2C_2F_5)_2$ is selected as a solute, and EC/DEC equal volume mixed solvent is selected as a solvent.

It is noted that although it is not shown in the above Tables 1–3, the same experiment as described above was performed with varying the mole ratio x of the added material to be 0.0001, 0.001, and 0.1. Although the amount of the generated gas increased as the mole ratio x was made larger, the results in the relationships with types of materials to be added, types of solutes, and types of solvents were confirmed to be the same as shown in the above Tables 1–3.

From the results as described thus far, it is understood that by employing a titanium-attached lithium cobalt oxide (Ti-attached $LiCoO_2$) in which titanium powder or the like is mixed with and attached to lithium cobalt oxide powder as a positive electrode active material, it is made possible to produce a cell in which the formation of the internal gas is suppressed. Such a Ti-attached $LiCoO_2$ is particularly useful as a positive electrode active material for use in a thin type sealed cell employing a laminated container. Such a laminated container is flexible and has a small strength against internal pressure, and therefore tends to induce such problems that it is easily expanded or deformed when an internal gas is formed in the cell, and that the sealing performance is deteriorated, causing a leakage of the electrolyte and so forth. However, when a positive electrode active material composed of Ti-attached $LiCoO_2$ is employed, the amount of the internally-generated gas is greatly reduced, and hence no such problems are induced.

Example 8

In this Example 8, a cell B of the present invention was prepared by employing a gel type polymer electrolyte for the electrolyte, and a laminated container as the cell case. The other conditions were the same as in those of the foregoing Example 1. Then, the discharge characteristics of the cell B was examined in the same manner as in the foregoing Experiment 1.

The preparation of the cell B was performed in the following manner. A positive electrode having the same configuration as that of the foregoing Example 1 (the mole ratio x=0.01) and a negative electrode having the same construction as that of Example 1 were prepared. Then, the positive and negative electrodes were wound with a porous polyethylene sandwiched between the positive and negative electrodes, and thus a power-generating component was formed. The power-generating component was inserted into a laminated container, and the container was filled with a pre-gel solution. For the pre-gel solution, polyethyleneglycoldiacrylate (molecular weight: 1000) was mixed with a solution in which $LiPF_6$ was added with a ratio of 1 mol/liter to a mixed solvent of an equal-volume of EC and DEC, so that a mass ratio of the polyethyleneglycoldiacrylate and the solution is 1:10, and then 5000 ppm of t-hexylperoxypivalate as a polymerization initiator was added thereto. Thereafter, 3 ml of the pre-gel solution thus prepared was filled into the laminated container, and then heat-treated at 60° C. for 3 hours to cure.

Comparative Example 8

A comparative cell Y of Comparative Example 8 was prepared in the same manner as in the above Example 8 except that a lithium cobalt oxide in which no titanium oxide powder is mixed was employed as the positive electrode active material.

Experiment 6

Figure 11:
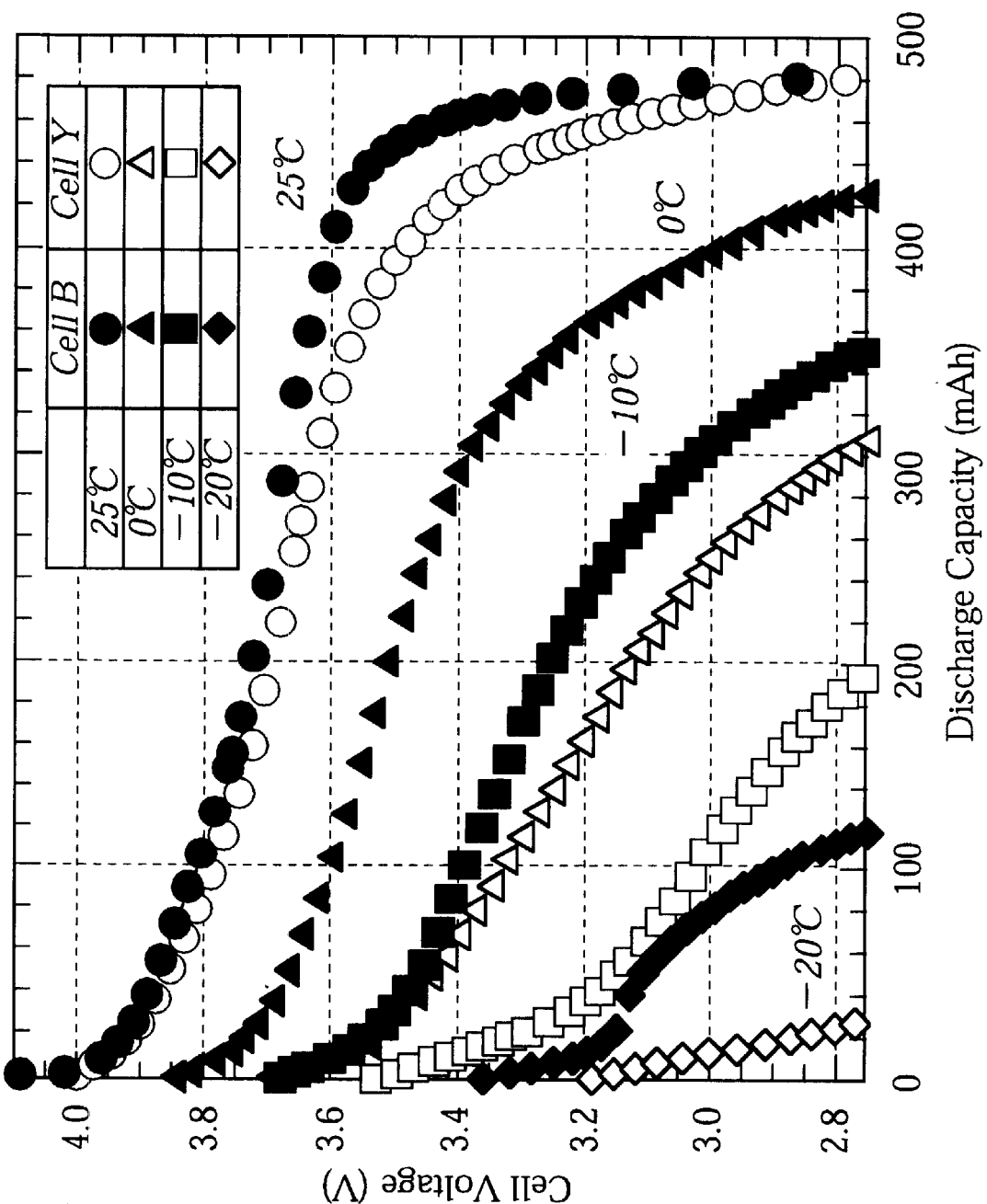
FIG. 11 is a graph illustrating the relationship between a cell voltage and a discharge capacity in a cell B of the present invention and a comparative cell Y of a comparative example.

The cell B of the present invention and the comparative cell Y were subjected to constant current charge and discharge tests under temperatures of −20° C., −10° C., 0° C., and 25° C. The results are shown in FIG. 11. The same conditions of the charging and discharging as in the foregoing Experiment 1 were employed.

As apparent from FIG. 11, in the comparative cell Y, as the temperature decreases, the cell voltage and the discharge capacity greatly declined, compared to the cell B of the present invention. In a low temperature range of −10° C. or below, the difference between the two cells was rendered more apparent.

This result seems to be attributed to the following. Generally, when a temperature goes down, ionic conductivity of the electrolyte is degraded. In particular, in the case where a film is formed at the interface between the active material and the electrolyte, transfer of electrons is thereby inhibited, causing a significant degradation in the discharge characteristics. This tendency is more apparent in the case of gel type solid electrolytes, since the gel type solid electrolytes exhibit lower ionic conductivities than fluid type electrolytes. Hence, in the cell B, which employs the lithium cobalt oxide in which titanium oxide power is attached, titanium particles present in a region adjacent to a surface of a lithium cobalt oxide particle serves to inhibit the formation of the film, and therefore, the transfer of electrons at the interface is performed more smoothly in comparison with the cell Y. As a result, the cell B achieves excellent low-temperature discharge characteristics.

As has been described thus far, the present invention achieves a cell having a high working voltage, as well as such advantageous effects as improved characteristics under low temperature, increased safety, reduction of the internal gas generation.

It is to be noted that, although graphite or coke was employed as a negative electrode active material in the above-described examples 1 through 8, the negative electrode active material usable in the present invention is not limited thereto. For example, carbonaceous materials capable of absorbing and releasing lithium ions, lithium metals, lithium alloys, and the like may also be employed.

In addition, the solvent of the electrolytic solution is not limited to the solvents mentioned above, but many other solvents may be used. An example for such solvents is a solvent in which ethylene carbonate is mixed at an appropriate ratio with a solvent having a low viscosity and a low boiling point such as dimethyl carbonate, methyl ethyl carbonate, tetrahydrofuran, 1,2-dimethoxyethan, 1,3-dioxolane, 2-methoxytetrahydrofuran, diethyl ether, and the like.

Further, for the solute in the electrolyte, $LiN(SO_2C_2F_5)_2$, $LiAsF_6$, $LiClO_4$, $LiBF_4$, $LiCF_3SO_3$, and the like may be used other than $LiPF_6$ mentioned hereinbefore.

In addition, the examples for the gel-like solid polymer include, other than the polyethyleneglycoldiacrylate mentioned hereinbefore, a polyether type solid polymer, a polycarbonate type solid polymer, a polyacrylonitrile type solid polymer, a copolymer comprising two or more of these polymers, polymer materials having a bridged structure, a fluoride type solid polymer such as polyvinylidene fluoride, and the like, and these materials may be used in combination with a lithium salt and an electrolytic solution.

Although the present invention and its advantages have been described in detail by way of example, it should be understood that various changes, modifications, and alterations can be made herein without departing from the spirit and scope of the invention as defined by the appended claims.

What is claimed is:

1. A non-aqueous electrolyte cell comprising in a cell case a positive electrode having a positive electrode active material comprising a Ti-attached $LiCoO_2$, a negative electrode, and an electrolyte comprising a non-aqueous solvent:

wherein the Ti-attached $LiCoO_2$ comprises a particle of a lithium cobalt oxide and at least one attaching substance selected from the group consisting of titanium, a titanium oxide, and a lithium-titanium complex oxide, the attaching substance attached on a surface of the particle of the lithium cobalt oxide; and wherein the mole ratio of the lithium cobalt oxide to the attaching substance is within the range of rom 1:0.00001 to 1:0.02.

2. The non-aqueous electrolyte cell according to claim 1, in which the non-aqueous solvent is a mixed solvent comprising ethylene carbonate.

3. The non-aqueous electrolyte cell according to claim 2, in which the electrolyte contains an imide salt represented by the structural formula $LiN(SO_2C_2F_5)_2$.

4. The non-aqueous electrolyte cell according to claim 3, in which the non-aqueous solvent is a mixed solvent containing ethylene carbonate and diethyl carbonate.

5. The non-aqueous electrolyte cell according to claim 4, in which the electrolyte comprising the non-aqueous solvent is a gel type solid polymer electrolyte.

6. The non-aqueous electrolyte cell according to claim 5, in which the cell case is composed of a laminated material in which an aluminum film and a resin film are layered.

7. The non-aqueous electrolyte cell according to claim 1, in which the negative electrode comprises a negative electrode active material, the negative electrode active material being a graphite capable of absorbing and releasing lithium ions.

8. A non-aqueous electrolyte cell comprising in a cell case a positive electrode having a positive electrode active material comprising a Ti-attached $LiCoO_2$, a negative electrode, and an electrolyte comprising an non-aqueous solvent:

wherein the Ti-attached $LiCoO_2$ comprises a particle of lithium cobalt oxide and at least one attaching substance selected from the group consisting of titanium, a titanium oxide, and a lithium-titanium complex oxide, the attaching substance attached on a surface of the particle of the lithium cobalt oxide; and wherein the mole ratio of the lithium cobalt oxide to the attaching substance is within the range of from 1:0.00001 to 1:0.02.

9. The non-aqueous electrolyte cell according to claim 8, in which the non-aqueous solvent is a mixed solvent comprising ethylene carbonate.

10. The non-aqueous electrolyte cell according to claim 9, in which the electrolyte contains an imide salt represented by the structural formula $LiN(SO_2C_2F_5)_2$.

11. The non-aqueous electrolyte cell according to claim 10, in which the non-aqueous solvent is a mixed solvent containing ethylene carbonate and diethyl carbonate.

12. The non-aqueous electrolyte cell according to claim 11, in which the electrolyte comprising the non-aqueous solvent is a gel type solid polymer electrolyte.

13. The non-aqueous electrolyte cell according to claim 12, in which the cell case is made of a laminated material in which an aluminum film and a resin film are layered.

14. The non-aqueous electrolyte cell according to claim 8, in which the negative electrode comprises a negative electrode active material, the negative electrode active material being a graphite capable of absorbing and releasing lithium ions.

15. A method of producing a non-aqueous electrolyte cell comprising in a cell case a positive electrode having a positive electrode active material composed of a lithium cobalt oxide, a negative electrode, and an electrolyte comprising a non-aqueous solvent, the method comprising the step of:

producing a positive electrode active material by preparing a Ti-attached lithium cobalt oxide in which a titanium oxide particle and/or a metallic titanium particle is attached on a surface of a lithium cobalt oxide particle, such that a lithium cobalt oxide powder is mixed with a titanium oxide powder and/or a metallic titanium powder, and thereafter the mixture is baked, so that the mole ratio of titanium and/or titanium oxide to lithium cobalt oxide is in the range of from 0.00001 to 0.02.

16. The method of producing a non-aqueous electrolyte cell according to claim 15, wherein the lithium cobalt oxide powder comprises particles of lithium cobalt oxide having an average particle diameter of 2–10 $\mu$m, and the titanium oxide powder and/or metallic titanium powder comprises particles of titanium oxide and/or metallic titanium having an average particle diameter of 5 $\mu$m or less.

17. A method of producing a non-aqueous electrolyte cell comprising in a cell case a positive electrode having a positive electrode active material composed of a lithium cobalt oxide, a negative electrode, and an electrolyte comprising a non-aqueous solvent, the method comprising:

producing a positive electrode active material by preparing a Ti-attached lithium cobalt oxide in which a lithium-titanium complex oxide particle is attached on a surface of a lithium cobalt oxide particle, such that a lithium cobalt oxide powder is mixed with a lithium-titanium complex oxide powder, and thereafter the mixture is baked, so that the mole ratio of titanium to lithium cobalt oxide is in the range of from 0.00001 to 0.02.

18. A method of producing a non-aqueous electrolyte cell comprising in a cell case a positive electrode having a positive electrode active material composed of a lithium cobalt oxide, a negative electrode, and an electrolyte comprising a non-aqueous solvent, the method comprising:

preparing a titanium-compound-mixed cobalt oxide by baking a cobalt oxide powder and at least one of a titanium oxide powder and a metallic titanium powder such that the mole ratio of titanium to lithium cobalt oxide is in the range of from 0.00001 to 0.02, crushing and grinding the titanium-compound-mixed cobalt oxide into a powdered state, preparing a Ti-attached lithium cobalt oxide in which a particle of titanium oxide and/or metallic titanium is attached on a surface of each lithium cobalt oxide particle, by mixing the powdered titanium-compound-mixed cobalt oxide with at least one lithium compound selected from the group consisting of lithium hydroxide, lithium carbonate, and lithium nitrate, and then baking the mixture.

\* \* \* \* \*

UNITED STATES PATENT AND TRADEMARK OFFICE
CERTIFICATE OF CORRECTION

PATENT NO. : 6,395,426 B1
DATED : May 28, 2002
INVENTOR(S) : Imachi et al.

It is certified that error appears in the above-identified patent and that said Letters Patent is hereby corrected as shown below:

<u>Title page,</u>
Item [56], References Cited, OTHER PUBLICATIONS, please change "$LiCo_1-xM_{22}$" to -- $LiCo_1-xMxO_2$ --

<u>Column 2,</u>
Line 63, please change "provide cell" to -- provide a cell --.

<u>Column 4,</u>
Line 48, please change "a, non-aqueous" to -- a non-aqueous --.

<u>Column 6,</u>
Line 30, please change "interlayer distance$_{002}$" to -- interlayer distance $d_{002}$ --
Line 45, please change "was place" to -- was placed --.

<u>Column 9,</u>
Line 55, please change "$0.00001 \leq x \leq 0.05$" to -- $0.00001 \leq x < 0.05$ --.
Lines 62-63, please change "$3x10_{-2}$" to -- $3x10^{-2}$ --.

<u>Column 10,</u>
Line 35, please change "-20C." to -- 20ºC. --

<u>Column 15,</u>
Line 8, please change "the range of rom" to -- the range of from --.
Line 33-34, please change "a particle of lithium cobalt oxide" to -- a particle of a lithium cobalt oxide --.
Line 41, please change "1:0.00001 to 1:0.02" to -- 1:0.00001 to 1:0.01 --.

Signed and Sealed this

Seventh Day of January, 2003

JAMES E. ROGAN
*Director of the United States Patent and Trademark Office*